United States Patent
Ikegawa et al.

(10) Patent No.: US 8,339,733 B2
(45) Date of Patent: Dec. 25, 2012

(54) METHOD FOR MANUFACTURING BASE MEMBER, METHOD FOR MANUFACTURING MOTOR, METHOD FOR MANUFACTURING INFORMATION APPARATUS, AND BASE MEMBER, MOTOR, AND INFORMATION APPARATUS

(75) Inventors: Taizo Ikegawa, Ehime (JP); Shoichi Yoshikawa, Tottori (JP); Toshiyuki Ninomiya, Ehime (JP); Hiroshi Nasu, Ehime (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/430,953

(22) Filed: Mar. 27, 2012

(65) Prior Publication Data

US 2012/0185076 A1 Jul. 19, 2012

Related U.S. Application Data

(62) Division of application No. 12/344,928, filed on Dec. 29, 2008, now abandoned.

(30) Foreign Application Priority Data

Feb. 29, 2008 (JP) .................................. 2008-051153

(51) Int. Cl.
- *G11B 33/10* (2006.01)
- *G06K 19/00* (2006.01)
- *G05B 19/19* (2006.01)

(52) U.S. Cl. ................. 360/99.16; 29/603.1; 29/603.03; 700/174

(58) Field of Classification Search ............... 360/99.15, 360/99.16, 137; 29/603.03, 603.1, 564.7, 29/56.5; 700/174
See application file for complete search history.

(56) References Cited

U.S. PATENT DOCUMENTS

| | | | |
|---|---|---|---|
| 5,281,798 A | 1/1994 | Hamm et al. | |
| 6,270,728 B1 | 8/2001 | Wijnschenk et al. | |
| 6,982,850 B1 * | 1/2006 | Ying | 360/97.16 |
| 7,146,713 B1 * | 12/2006 | Ying | 29/603.16 |
| 2003/0031114 A1 | 2/2003 | Noda et al. | |
| 2005/0213458 A1 * | 9/2005 | Iwase | 369/53.35 |

FOREIGN PATENT DOCUMENTS

| | | |
|---|---|---|
| CN | 1397949 | 2/2003 |
| JP | 58-163209 | 10/1983 |

(Continued)

OTHER PUBLICATIONS

Chinese Office Action (and English translation thereof) issued Jul. 2, 2012 in Chinese Application 200810185960.4 which is a foreign counterpart of the present application.
English-machine translation of JP 2001-101777 to Matsumura et al., published on Apr. 13, 2001.

(Continued)

*Primary Examiner* — Will J Klimowicz
(74) *Attorney, Agent, or Firm* — Wenderoth Lind & Ponack, L.L.P.

(57) ABSTRACT

A base member on which a plurality of components are mounted includes a base main body, a coating formed on a surface of the base main body, and a display portion formed by a contrast between the coating and the surface of the base main body. The display portion displays a state by which it is determined whether or not the base main body has been machined in accordance with a corresponding machining program.

16 Claims, 14 Drawing Sheets

FOREIGN PATENT DOCUMENTS

| | | |
|---|---|---|
| JP | 58-164710 | 11/1983 |
| JP | 03-086274 | 4/1991 |
| JP | 7-21301 | 1/1995 |
| JP | 2001-502595 | 2/2001 |
| JP | 2001-101777 | 4/2001 |

OTHER PUBLICATIONS

Chinese Office Action (and English translation thereof) issued Dec. 1, 2011 in Chinese Application 200810185960.4 which is a foreign counterpart of the present application.

* cited by examiner

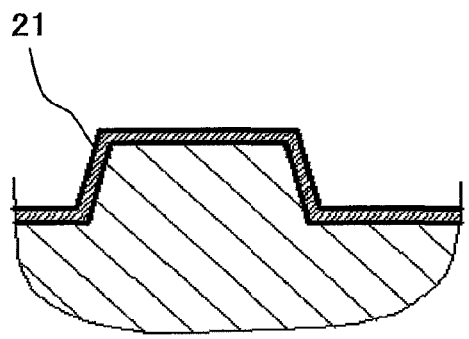 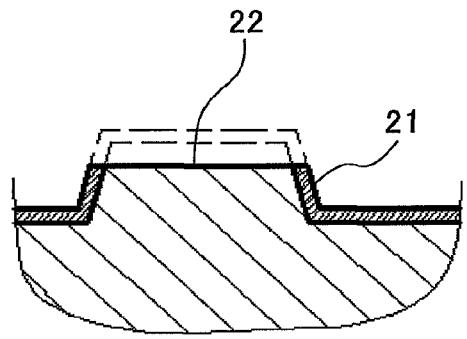
FIG. 8A  FIG. 8B
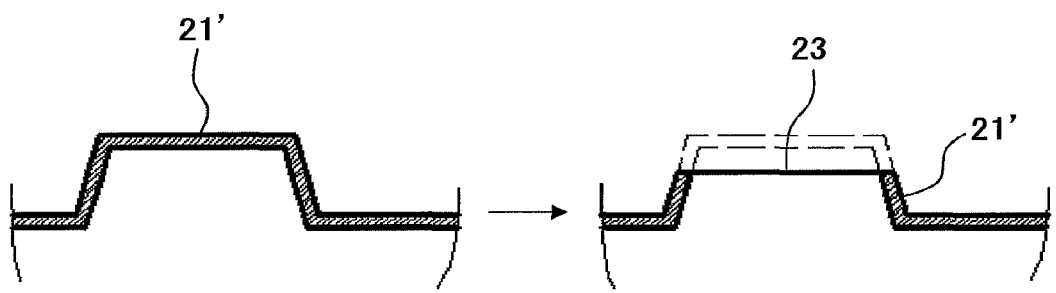
FIG. 9

METHOD FOR MANUFACTURING BASE MEMBER, METHOD FOR MANUFACTURING MOTOR, METHOD FOR MANUFACTURING INFORMATION APPARATUS, AND BASE MEMBER, MOTOR, AND INFORMATION APPARATUS

This application is a divisional of application Ser. No. 12/344,928, filed Dec. 29, 2008 now abandoned, which claims priority under 35 U.S.C. §119 to Japanese Patent Application No. 2008-51153 filed on Feb. 29, 2008. The entire disclosure of Japanese Patent Application No. 2008-51153 is hereby incorporated herein by reference.

BACKGROUND OF THE INVENTION

1. Field of the Invention

The present invention relates to a base member on which a plurality of members are mounted, and to a method for manufacturing this base member, and further relates to a motor, an information apparatus, and methods for manufacturing them.

2. Background Information

For example, a hard disk drive (HDD) comprises a spindle motor, a recording disk attached to the spindle motor, a head for reproducing data from the recording disk or recording data to the recording disk, and an actuator for driving the head.

The spindle motor and actuator of a hard disk drive are mounted on a base plate. The base plate is, for example, a member obtained by subjecting a blank obtained by aluminum die casting to precision machining with a machining center or the like. Structures are formed in the base plate, such as the shape of ribs provided to the blank, the attachment portion of the actuator, and the screw portion for component attachment, and the shape of these structures vary with the model of the hard disk drive. The reason is that the specifications of the attached components vary with differences in the number of disks, the rotating speed, the intended application, and so forth.

Meanwhile, between models of the same form factor (such as 2.5-inch) from the same hard disk drive manufacturer, the shapes are very similar, making it difficult to tell at a glance the difference between the shapes of the above-mentioned structures. Consequently, a blank is sometimes accidentally supplied to a machining center corresponding to a different model. When this happens, the blank ends up being precision machined by a machining program corresponding to a different model. In such a case it is hard to notice that the product is irregular, and this accidentally machined base plate may continue on to the next production line without being detected. This can result in the base plate ending up in a completed hard disk drive, and may not be detected until the shipping inspection step. As a result, after the shipping inspection step, the completed product has to be discarded or reassembled.

Therefore, a mark is formed to identify the model of the base plate. For instance, there is a known technique whereby a plurality of display holes indicating a manufacturing die number are formed in a base plate (see Japanese Laid-Open Patent Application 2001-101777, for example). However, with the technique discussed in Japanese Laid-Open Patent Application 2001-101777, there is the risk that the base plate strength and hermetic seal will be diminished. To solve this problem, there is also a known technique in which a base plate is provided with a plurality of coded protrusions, or letters are written in relief to display the model name, etc.

When a model name or the like is coded and written in relief on a base plate, the model name is determined by image recognition technology using an image recognition apparatus prior to precision machining However, noise tends to be picked up due to the effects of surface irregular reflection or the like, and solving this problem requires fine adjustment of the image recognition apparatus. Also, in the case of letters, misrecognition is inevitable because of factors such as blurring due to wear of the stamper.

In view of the above, it will be apparent to those skilled in the art from this disclosure that there exists a need for an improved a method for manufacturing a base member. This invention addresses this need in the art as well as other needs, which will become apparent to those skilled in the art from this disclosure.

SUMMARY OF THE INVENTION

It is an object of the present invention to be able to discover improper supply soon and by a simple method when a blank is mistakenly supplied to a precision machining apparatus corresponding to the wrong model.

According to a first aspect, a method for manufacturing a base member is a method for manufacturing a base member on which a plurality of members are mounted, in which a plurality of kinds of material (or they are called blanks) are machined according to a machining program that differs for each type of materials. The method includes the following steps.

A preparation step of providing a display portion with a different shape for each type of material A machining step of machining the material according to a machining program A machining operation step of performing an operation for machining the display portion as part of the machining step, and thereby making it possible to determine whether or not the material has been machined in the proper combination according to the corresponding machining program With this method, since it is possible to determine whether or not the material has been machined according to the corresponding machining program, if the material is mistakenly supplied to a precision machining apparatus corresponding to the wrong model, the missupply can be detected early on by a simple method.

It is preferable that, in the machining operation step, an operation is performed for machining the display portion by a different method for each type of machining programs.

It is preferable that, in the machining operation step, a normal mark is recorded to the display portion when the material is machined in the proper combination according to the corresponding machining program.

With this method, a normal mark is recorded when the material is machined in the proper combination. Therefore, it can be determined from the presence or absence of the normal mark whether or not the combination of material and machining program is the proper one.

It is preferable that, in the preparation step, a model identification portion is provided to the display portion for identifying the type of material, and in the machining operation step, the normal mark is recorded by machining the model identification portion and/or a portion of the display portion other than the model identification portion.

With this method, it can be determined from the presence or absence of the normal mark whether or not the combination of material and machining program is the proper one, and furthermore the type of material can be determined by the model identification portion.

It is preferable that, in the machining operation step, an abnormal mark is recorded to the display portion when the material is machined according to a machining program other than the corresponding machining program.

With this method, an abnormal mark is recorded when the material is not machined in the proper combination. Therefore, it can be determined from the presence or absence of the abnormal mark whether or not the combination of material and machining program is the proper one.

It is preferable that, in the preparation step, a model identification portion is provided to the display portion for identifying the type of material, and in the machining operation step, the abnormal mark is recorded by machining the model identification portion and/or a portion of the display portion other than the model identification portion.

With this method, it can be determined from the presence or absence of the abnormal mark whether or not the combination of material and machining program is the proper one, and furthermore the type of material can be determined by the model identification portion.

It is preferable that the method further includes a judgment step of determining, on the basis of the state of the display portion, whether or not the material was machined according to the corresponding machining program.

With this method, it can be determined in the judgment step whether or not the combination of the material and the machining program is the proper one.

It is preferable that, in the judgment step, a reference mark in a reference location is also used.

With this method, since the reference mark is used in the judgment step to determine whether or not the material has been machined according to the corresponding machining program, judgment precision can be improved.

It is preferable that the method further includes a formation step of forming the reference mark near the display portion, as part of the machining step.

It is preferable that, in the machining operation step, a plurality of locations are machined within the display portion.

With this method, whether or not the material has been machined according to the corresponding machining program can be determined from the combination of machined locations.

It is preferable that, in the machining operation step, part of the surface of the material is made to be different in its shape or properties.

With this method, since image recognition technology is used to determine whether or not the combination of the material and the machining program is the proper one, judgment is easier. The phrase "the surface shape is made to be different" as used here encompasses making holes, planing, forming grooves, and so forth. The phrase "the surface properties are made to be different" encompasses changing the color, surface roughness, and so forth by means of cutting, painting the surface, and so forth.

It is preferable that, in the machining operation step, the color of part of the display portion is made to be different from the color of the other part of the display portion.

It is preferable that, in the machining operation step, the surface of part of the display portion is peeled off.

It is preferable that, in the machining operation step, the surface of part of the display portion is tinted or painted.

It is preferable that, in the machining operation step, the surface roughness of part of the display portion is made to be different from the surface roughness of the other part of the display portion.

According to a second aspect, a method for manufacturing a motor includes the method for manufacturing a base member pertaining to the first aspect, and a mounting method for mounting various components mounted to the base member.

With this method, a base member that has been precision machined by a machining program other than the corresponding machining program will be difficult to utilize in subsequent steps, so it is less likely that a mistakenly machined base member will be assembled into a motor.

According to a third aspect, a method for manufacturing an information apparatus includes the method for manufacturing a motor as described, and an assembly method for assembling into the motor a rotating body that is rotated by the motor, and an information transmission device for transmitting information in conjunction with the rotating body are assembled into the motor.

With this method, base member that has been precision machined by a machining program other than the corresponding machining program will be difficult to utilize in subsequent steps, so it is less likely that a mistakenly machined base member will be assembled into an information apparatus.

According to a fourth aspect, a base member is a base member on which a plurality of components are mounted. The base member includes a base main body and a display portion that displays a state by which it can be determined whether or not the base main body has been machined in the proper combination according to the corresponding machining program. The phrase "state by which it can be determined" refers to a state obtained depending on the combination of the structure of the material and the machining by machining program, and encompasses both a case when the display portion has actually been machined by the machining program, and a case in which it has not.

With this base member, since a state by which it can be determined whether or not the base main body has been machined in the proper combination according to the corresponding machining program is recorded to the display portion, if the base main body is mistakenly supplied to a precision machining apparatus corresponding to the wrong model, the missupply can be detected early on by a simple method.

It is preferable that a model identification portion is provided to the display portion for identifying the type of base main body. The above-mentioned state is achieved by the model identification portion and/or a portion of the display portion other than the model identification portion.

With this base member, whether or not the proper machining has been performed can be determined from the above-mentioned state, and furthermore the type of material can be determined from the model identification portion.

According to a fifth aspect, a motor includes a base member manufactured by the method for manufacturing a base member pertaining to the first aspect, or the base member as described and a rotation apparatus that is installed on the base member.

With this motor, a base member that has been precision machined by a machining program other than the corresponding machining program can be easily detected. Therefore, it is less likely that a mistakenly machined base member will be assembled into a motor.

According to a sixth aspect, an information apparatus includes the motor as described, a rotating body that is rotated by the motor, and an information transmission device for transmitting information in conjunction with the rotating body.

With this information apparatus, a base member that has been precision machined by a machining program other than the corresponding machining program can be easily detected. Therefore, it is less likely that a mistakenly machined base member will be assembled into an information apparatus.

With the method for manufacturing a base member pertaining to the present aspect, it is possible to determine whether or not a material has been machined according to the corresponding machining program, so if the material mistakenly is supplied to a precision machining apparatus corresponding to the wrong model, the missupply can be detected early on by a simple method.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 8 is a schematic cross section illustrating the display portion machining operation in the second embodiment;

FIG. 9 is a schematic cross section illustrating the display portion machining operation in the third embodiment;

FIG. 19 consists of diagrams illustrating the machined state of the display portion machining operation in the twelfth embodiment;

DETAILED DESCRIPTION OF THE INVENTION

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 21:
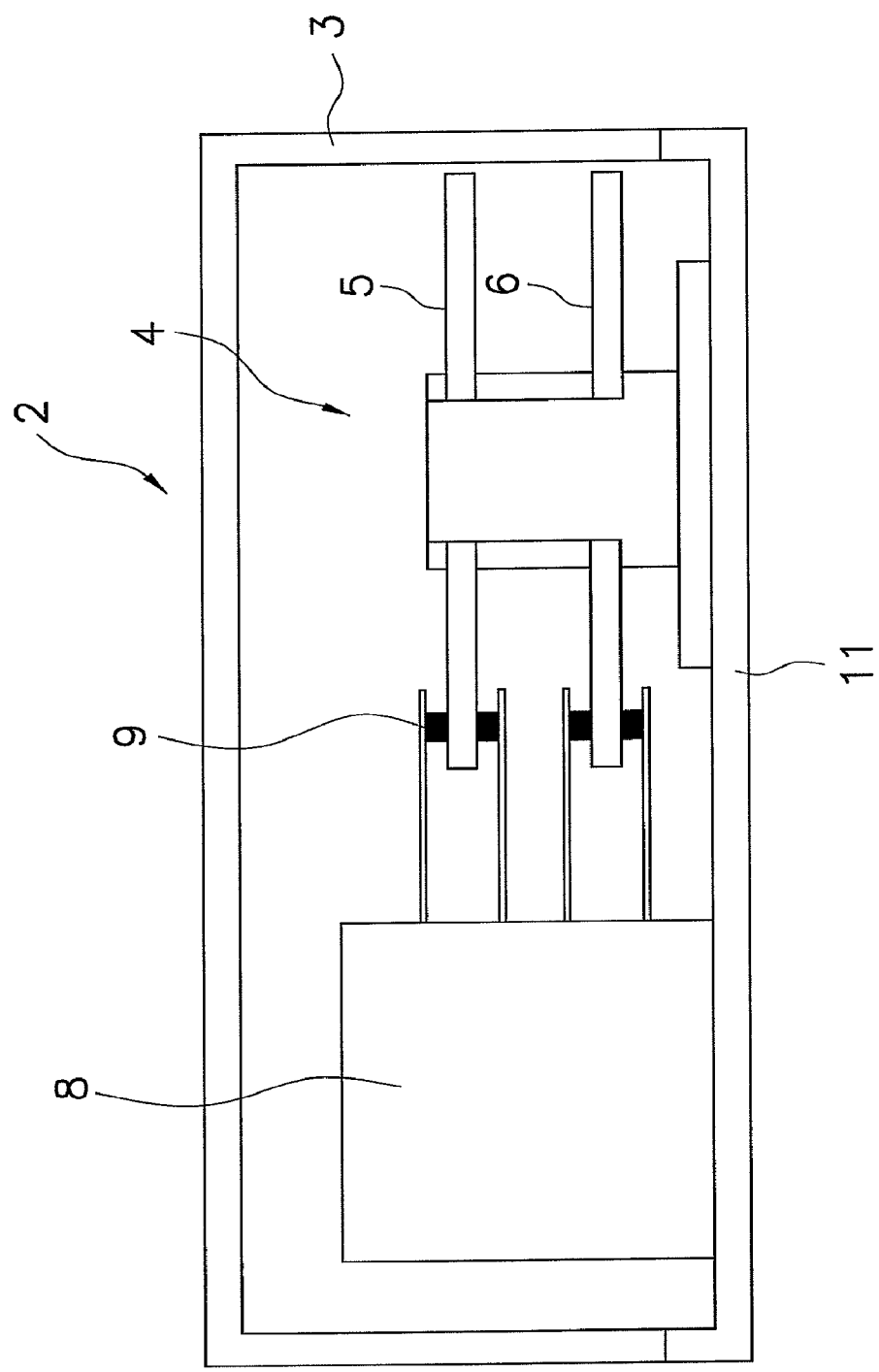
FIG. 21 is a schematic cross section of a hard disk drive as an example of the information apparatus in an embodiment of the present invention.

FIG. 21 is a schematic cross section of a hard disk drive as an example of the information apparatus in an embodiment of the present invention. The hard disk drive 2 has a housing comprising a base plate 11 and a cover plate 3. The hard disk drive 2 has a spindle motor 4 and an actuator 8 on the base plate 11 inside the sealed housing. The actuator 8 is a mechanism for driving heads 9. In this embodiment, two magnetic disks 5 and 6 are mounted on the spindle motor 4. While the spindle motor 4 rotates and causes the magnetic disks 5 and 6 to rotate, the actuator 8 operates the heads 9 to record or reproduce information.

As mentioned above, the spindle motor 4 and the actuator 8 are mounted on the base plate 11. Therefore, the base plate 11 has a structure for attaching various components. Although it is depicted in FIG. 21 as having a flat shape, the structures for attaching the various components may have mutually different heights.

First Embodiment

Figure 1:
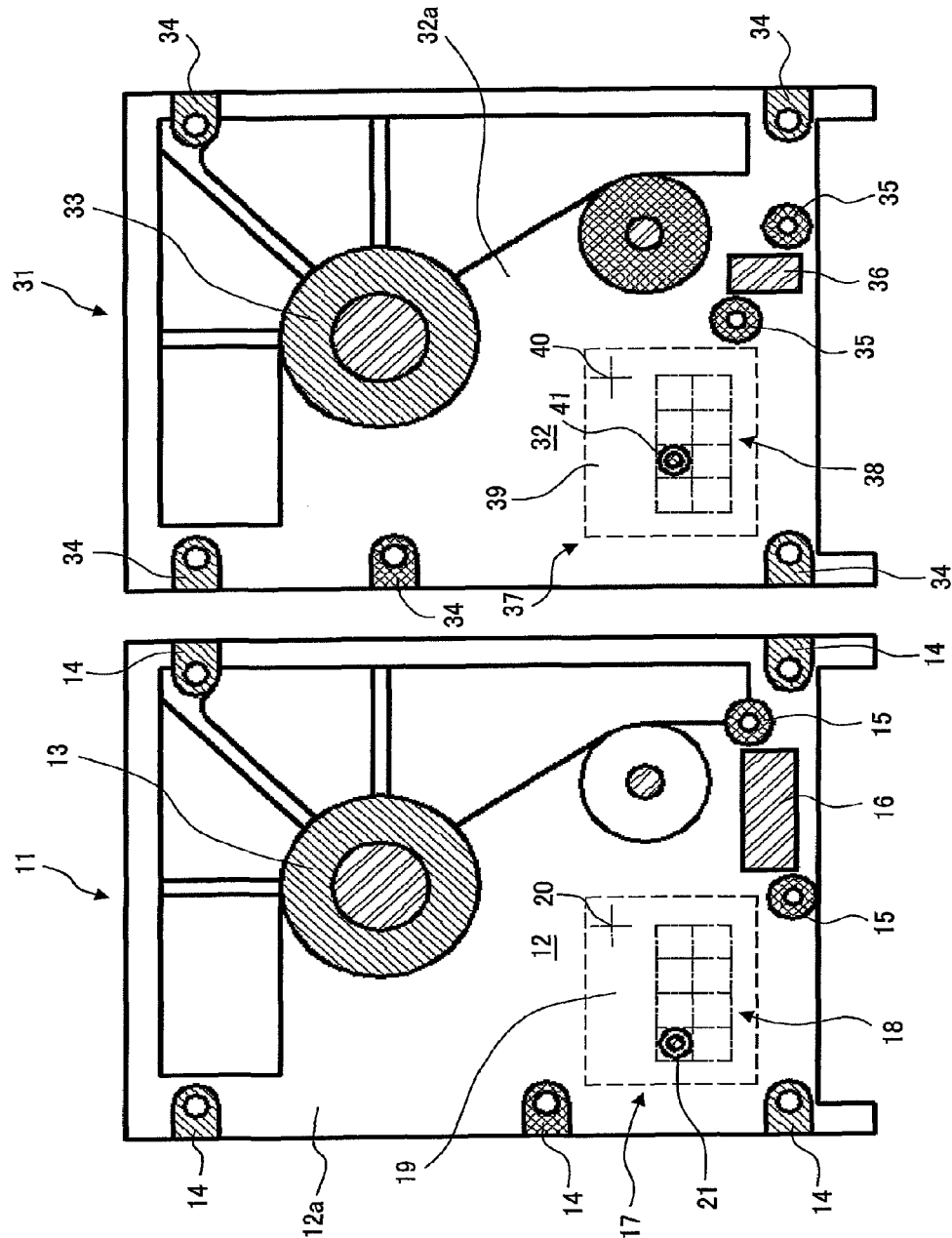
FIG. 1 is simplified external side views of two kinds of base plates in the first embodiment of the present invention.

FIG. 1 consists of simplified external side views of two kinds of base plates made by aluminum die casting in the first embodiment of the present invention. In order to prevent the generation of outgas, etc., after the die casting of the base plate, its surface is coated by electro deposition of a black epoxy resin, after which this is baked to form a coating film that also serves as an insulating coating. The "external sides" referred to here are the faces on the outside of the housing. The base plate 11 is shown on the left, and a base plate 31 is shown on the right. The base plate 11 is a plate that belongs to a model A, while the base plate 31 is a plate that belongs to a model B. The "model" in the following description refers to the type of hard disk drive, and saying that the models are different means that the structures of the devices are different. Therefore, the structures of the base plates belonging to different models are mutually different.

In the drawings, the various types of hatching indicate precision machined faces. Hatching with a single line indicates machined regions of a common shape, cross-hatching indicates machined regions whose shape is specific to the model, and hatching with a double line indicates perforated regions formed during casting.

Various structures are formed on the external side 12a of a plate main body 12 of the base plate 11. For example, a plurality of HDD attachment reference faces 14 are formed around the outer edge of the plate main body 12. Also, two connector fixing portions 15 and a connector insertion through-hole 16 are formed in the plate main body 12. Also shown in the drawings is a lower end reference portion 13 for a spindle motor.

Various structures are formed on the external side 32a of a plate main body 32 of the base plate 31. For example, a plurality of HDD attachment reference faces 34 are formed around the outer edge of the plate main body 32. Also, two connector fixing portions 35 and a connector insertion through-hole 36 are formed in the plate main body 32. Also shown in the drawings is a lower end reference portion 33 for a spindle motor.

Thus, the base plate 11 and the base plate 31 have roughly the same structures, but as is clear from the drawings, their positions and sizes as well as their heights of the structures are different. In the description of the present invention, saying that the structures are different for each model encompasses a case when only some of the structures are different.

Figure 5:
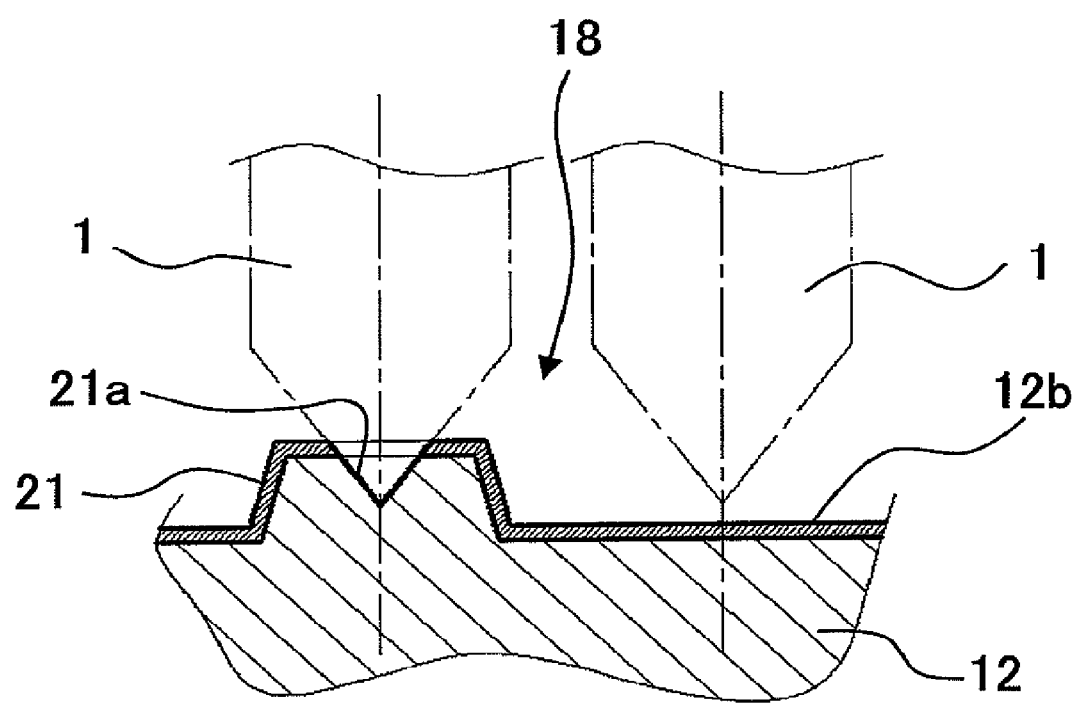
FIG. 5 is a schematic cross section illustrating the display portion machining and non-machining operation in the first embodiment of the present invention.

Furthermore, a display portion 17 is formed on the base plate 11. The display portion 17 is the rectangular region indicated by broken lines in the drawing. The display portion 17 is made up of a mark recording portion 18 and the remaining portion 19. The mark recording portion 18 is divided into a plurality of regions as indicated by the chain lines in the drawing. In this embodiment, the matrix consists of two rows and four columns, so that a total of eight regions are formed. With the base plate 11, a model identification portion 21 is formed in the region of the first row and first column of the mark recording portion 18. The model identification portion 21 is a convex portion as shown in FIG. 5, and forming it in this region indicates that this base plate goes to the model A. In this embodiment, the model identification portion 21 has a trapezoidal cross section, and the upper face has a diameter of 1.0 to 1.5 mm and a height of approximately 0.2 mm. The pitch of the regions is 1.0 to 1.5 mm. A reference mark position 20 is indicated in the remaining portion 19 of the display portion 17. The size of the model identification portion 21 may be suitably changed as needed.

A display portion 37 is formed on the base plate 31. The display portion 37 is the rectangular region indicated by broken lines in the drawing. The display portion 37 is made up of a mark recording portion 38 and the remaining portion 39. The mark recording portion 38 is divided into a plurality of regions as indicated by the chain lines. In this embodiment, the matrix consists of two rows and four columns, so that a total of eight regions are formed. With the base plate 31, a model identification portion 41 is formed in the region of the first row and second column of the mark recording portion 38. The model identification portion 41 is a convex portion, as is the model identification portion 21, and forming it in this region indicates that this base plate goes to the model B. A reference mark position 40 is indicated in the remaining portion 39 of the display portion 37.

The broken lines or chain lines indicating the display portion and the mark recording portion may protrude as ridge lines, or may not be there at all. Further, the regions of the mark recording portion may be indicated by the intersections of crossed lines.

Figure 2:
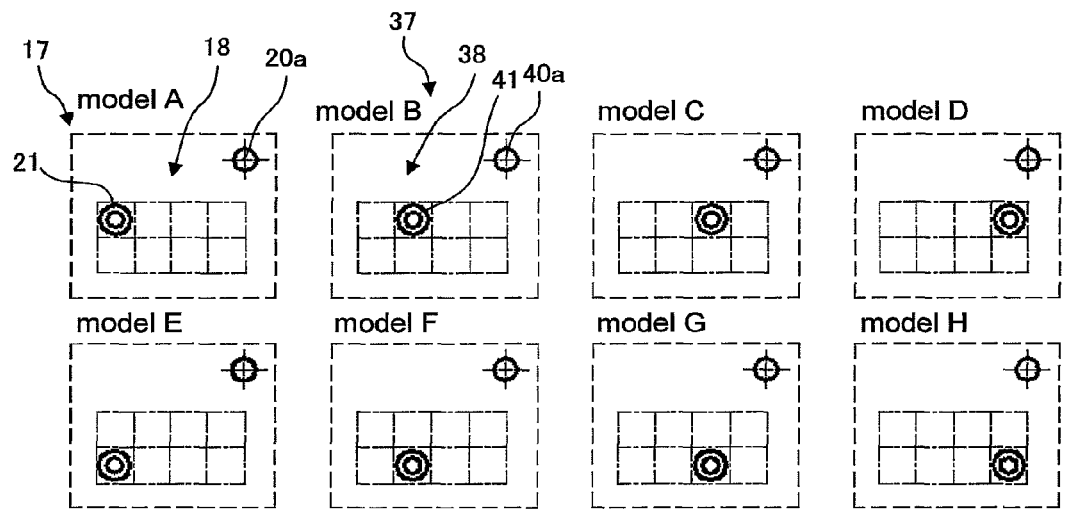
FIG. 2 consists of diagrams illustrating the shape of the display portion on the external side of different types of base plate.

FIG. 2 consists of diagrams illustrating the shape of the display portion on the external side of different types of base plate. In models A to H, the model identification portion is formed in different regions within the mark recording portion. These diagrams indicate a state in which precision machining of the external sides is complete. Therefore, a reference mark 20a has been pre-drilled at the reference mark position 20, and the model identification portions are in a state of having been machined (such as a state in which the coating has been removed to expose the base material), which will be described later.

Figure 3:
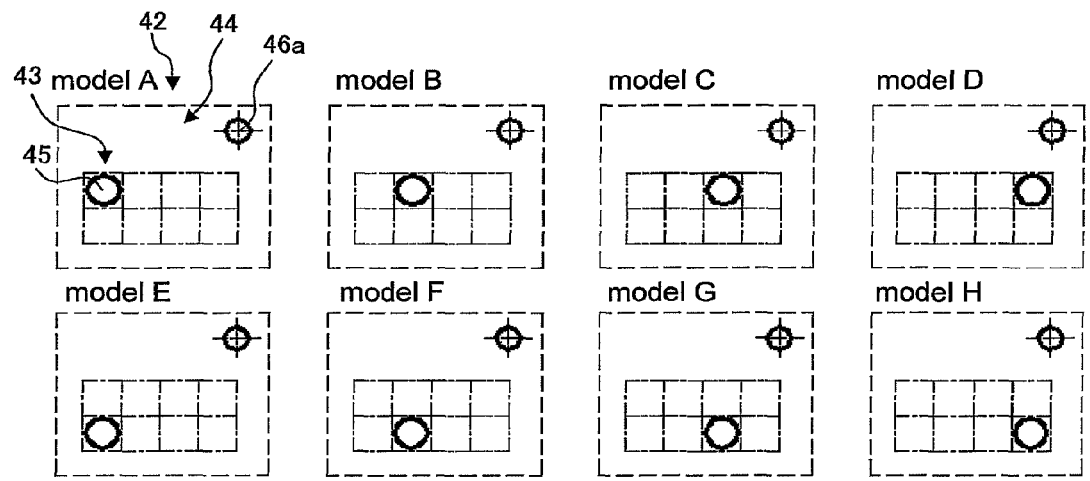
FIG. 3 consists of diagrams illustrating the shape of the display portion on the internal side of different types of base plate.

FIG. 3 consists of diagrams illustrating the shape of the display portion on the internal side of different types of base plate. The display portion 42 is the rectangular region indicated by broken lines in the drawing. The display portion 42 is made up of a mark recording portion 43 and the remaining portion 44. The mark recording portion 43 is divided into a plurality of regions as indicated by the chain lines. In this embodiment, the matrix consists of two rows and four columns, so that a total of eight regions are formed. The reference mark position is the same on the internal side of the base plate as on the external side, but the model identification portion is not formed on the mark recording portion 43, and the mark recording portion 43 is flat overall. This drawing indicates a state in which the precision machining of the internal side is complete. Therefore, a reference mark 46a is formed at the reference mark position, and a pre-drill 45 is formed in a specific region of the mark recording portion 43. The pre-drill 45 is, for example, a portion where the coating has been removed to expose the base material.

Figure 4:
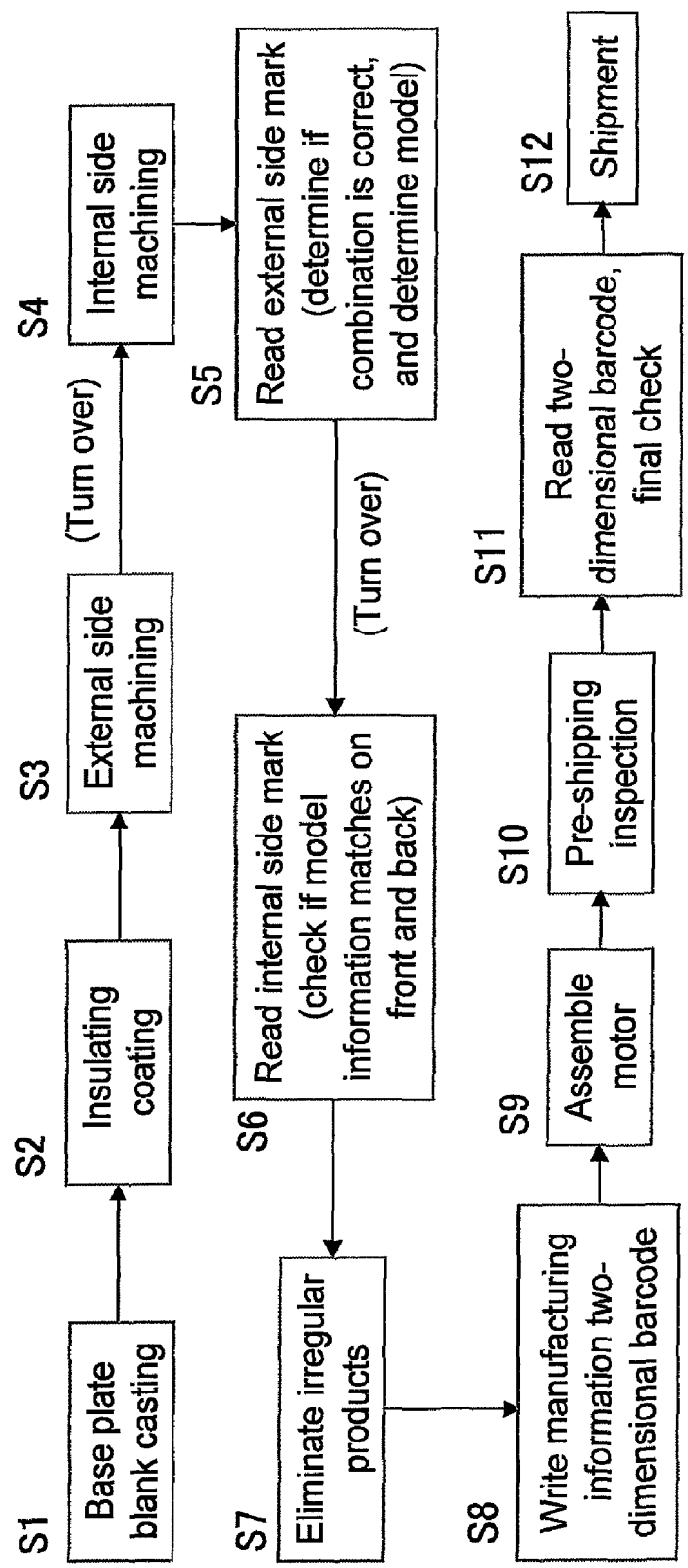
FIG. 4 is a flowchart of the steps for assembling a motor in the first embodiment of the present invention.

FIG. 4 is a flowchart of the steps for assembling a motor in the first embodiment of the present invention. The following description will be of the manufacture and precision machining of the base plate 11 (model A).

In step S1 (preparation step), a blank of the base plate 11 is aluminum die-cast. Blanks of different shapes are obtained for each model here. In the casting of these blanks, the model identification portion 21 of the mark recording portion 18 is formed by the casting mold. The blank may be manufactured by injection molding, compression molding, sintering, forging, press working, or the like, as dictated by the material.

In step S2, both sides of the blank are given an insulating black coating by electro deposition coating. As a result, as shown in FIG. 5, for example, a coating 12b is formed on the surface of the blank. An epoxy-based paint may be applied by electro deposition coating, and if the blank is composed of a copper alloy or iron sheet, it may be plated with chromium or nickel. The coating may also be applied by vapor deposition or sputtering.

In step S3 (machining step), the external side of the blank is subjected to precision machining More specifically, the motor attachment face or the like is precision machined with a machining center or the like on the basis of a machining program according to the model.

In step S3, as part of the machining step, a machining operation step for making it possible to determine whether or not the blank has been machined in the proper combination according to the corresponding machining program is further performed by performing an operation of machining the display portion 17 by a different method for each machining program. In the machining operation step, as shown in FIG. 5, a drill 1 with a pointed tip is lowered to a specific height at the position of the model identification portion for the blank corresponding to the model of the machining program in question. As a result, when the blank for model A is machined by the machining program for model A, as shown on the left side in FIG. 5, the drill 1 machines the model identification portion 21, and a pre-drill 21a (the portion where the coating 12b is removed to reveal the aluminum substrate) is formed as a normal mark. On the other hand, when a blank for model A is machined by the machining program for model B, for example, as shown on the right side in FIG. 5, the drill 1 does not machine the model identification portion 21. That is, the model identification portion is machined when there is the proper combination of blank and machining program, and is not machined otherwise. The lowest point to which the drill 1 descends is a position at which the model identification portion will be cut, but the surface of the rest of the surrounding flat portion is not cut. Therefore, the rest of the region of the mark recording portion 18 is not cut when the combination is not the proper one.

The drill 1 also performs reference pre-drilling More specifically, center forming of the reference mark position 20 is performed to form the reference mark 20a.

The diameter of the mark formed at the model identification portion 21 is preferably from 0.4 to 0.6 mm. If it is less than 0.4 mm, it will be difficult to distinguish from scattered reflection caused by microscopic bumps on the blank.

Meanwhile, if the diameter of the model identification portion itself is made sufficiently small, it will be possible to determine the shape precision of blank casting fin and so forth. More specifically, when a blank with casting fin or the like is chucked, the machining position may be significantly offset from the intended position, and if the pre-drill center position deviates too much from the model identification portion center, then the pre-drill will not be formed at the model identification portion.

In step S4, the internal side of the blank is precision machined. In this embodiment, the external and internal side machining is carried out with separate precision machining apparatuses. In the internal side machining step, as shown in FIG. 3, model information expressing the internal side machining program itself is simultaneously machined by pre-drilling or the like.

In step S5, the display portion on the external side of the blank is read. This operation is performed by an image recognition apparatus including a camera and a computer capable of image processing. The pre-drill 21a reveals the aluminum substrate, while leaving the surrounding black insulating coating intact, so the contrast between the two is high, affording reliable recognition.

Figure 6:
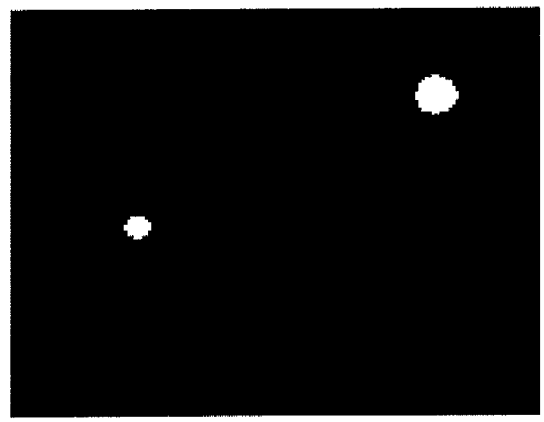
FIG. 6 is a binarized image illustrating the machined state of the display portion.

FIG. 6 is a binarized image illustrating the machined state of the display portion. As is clear from the diagram, the machined reference mark and the machined mark are recognized as two white circles. In this case, it can be determined that the combination of blank and machining program is the proper one, and the model name can also be determined.

Here, the reference mark is formed at a position close to the mark, which makes it easy to read the mark coordinates. In particular, if there is some kind of abnormal bump or the like on the blank that causes an abnormality in the reflective state, there is the possibility that it will be misrecognized as a mark, but the misrecognition rate can be lowered by forming a distinct reference mark and using it as a reference to process as noise anything away from the relative position where the mark is supposed to be. This not only tells if the combination is correct, but also allows model identification to be carried out accurately. Furthermore, even if there is deformation or casting fin at the positioning portion used for fixing to the image recognition apparatus, and the overall position is offset, as long as the reference mark can be recognized, the model identification portion misrecognition rate will be reduced.

Figure 7:
FIG. 7 is a binarized image illustrating the unmachined state of the display portion.

FIG. 7 is a binarized image illustrating the unmachined state of the display portion. As is clear from the diagram, only the machined reference mark is displayed as a white circle. In this case, it can be determined that the combination of blank and machining program is not the proper one.

In step S6 (judgment step), the mark recording portion 43 on the internal side of the blank is read, the result of this reading is subjected to image processing, and the model information for the external side is checked to see if it matches the model information for the internal side. If the model information for the machining program on the external side coincides with the model information for the machining program on the internal side, it is determined that machining programs for the blank and the internal and external sides are in complete agreement.

In this embodiment, the marks on both sides are read by turning the base plate over, but two reading sensors may be provided so that both sides can be read at the same time.

In step S7, any irregular products are eliminated. More specifically, this applies to when the combination of the blank model information and the machining program model information was not the proper one in step S5, or when the model information for the external side did not match the model information for the internal side in step S6.

In step S8, manufacturing information (manufacturing lot number, date, machining apparatus information, and other such information necessary for tracing) is laser etched on the external side of the blank as a two-dimensional barcode.

In step S9, motor assembly is carried out. More specifically, the spindle motor 4 and the actuator 8 are attached to the base plate 11 to complete the hard disk drive.

Pre-shipment inspection is performed in step S10, and in step S11 the two-dimensional barcode is read and recorded to the production management database. After the above-mentioned final check, the product is shipped in step S12. The two-dimensional barcode does not necessarily have to be formed.

With this method, it is possible to determine whether or not a material has been machined according to the corresponding machining program, so when a material is mistakenly supplied to a precision machining apparatus corresponding to the wrong model, the missupply can be detected early on by a simple method. In particular, when the material has been properly machined, a mark indicating this is recorded, so whether or not the combination of material and machining program is the proper one can be determined from the presence or absence of this mark. Furthermore, the type of material can be determined from the model identification portion.

With a completed hard disk drive, since the display portion 17 is formed on the external side 12a of the base plate 11, whether the device is passable or not can be determined right away. When the display portion 17 is on the internal side of the base plate, it cannot be checked without breaking the seal, in which case the hard disk drive has to be taken apart.

The step of reading the mark on the external side may be performed immediately after the external side machining Also, the reading of the mark on the external side may be performed visually by a human.

If the precision machining of the external and internal sides of the base plate is carried out simultaneously by the same machining program device, there is no need to form the display portion 42 on the internal side during casting of the blank in step S1, there is no need for machining the display portion 42 in the internal side machining in step S4, nor is there any need for the entire step S6.

The model identification portion on each base plate is not limited to a single one, and a plurality of model identification portions may be combined. However, it is preferable to keep the number of model identification portions consistent for all models. This is because in bit management the number of model identification portions will not be consistent, which poses problems when the right and wrong judgment is performed visually.

Second Embodiment

FIG. 8 is a schematic cross section illustrating the display portion machining operation in a second embodiment. FIG. 8A is before machining, and FIG. 8B is after machining In this embodiment, the surface of the model identification portion 21 is cut away and flattened with an end mill. As a result, the exposed aluminum surface 22 becomes the normal mark.

Third Embodiment

FIG. 9 is a schematic cross section illustrating the display portion machining operation in a third embodiment. FIG. 9A is before machining, and FIG. 9b is after machining In this embodiment, the base plate includes a sheet metal chassis, a model identification portion 21' is cut away with an end mill, and a hole 23 is formed as the normal mark. In this case, judgment can also be carried out with transmitted light.

The method for machining the mark is not limited to cutting, and may instead entail welding, deposition, or another such step, or may be press working or another type of plastic deformation. In this case, after blank manufacture, other machining steps may be included offline.

Fourth Embodiment

Figure 10:
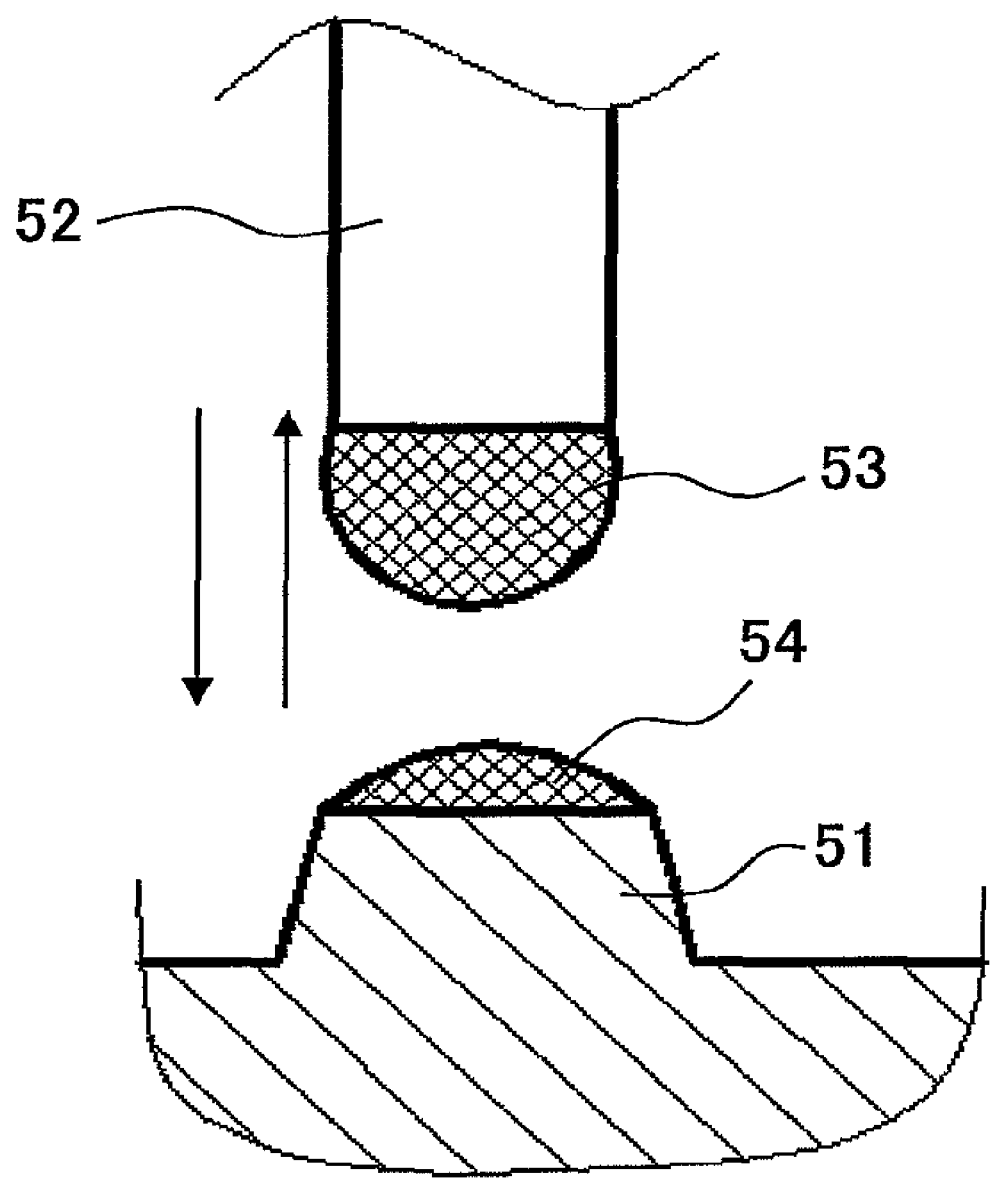
FIG. 10 is a schematic cross section illustrating the display portion machining operation in the fourth embodiment.

FIG. 10 is a schematic cross section illustrating the display portion machining operation in a fourth embodiment. In this embodiment, the surface of a model identification portion 51 is coated with paint 53 using a dispenser 52. The color of the paint is different from the color of the blank surface. As a result, a tinted portion 54 is formed as the normal mark on the surface of the model identification portion 51.

A fluorescent paint may be used here, in which case there is no need for it to be a different color from that of the blank, and it can be detected easily when irradiated with a black light.

Fifth Embodiment

Figure 11:
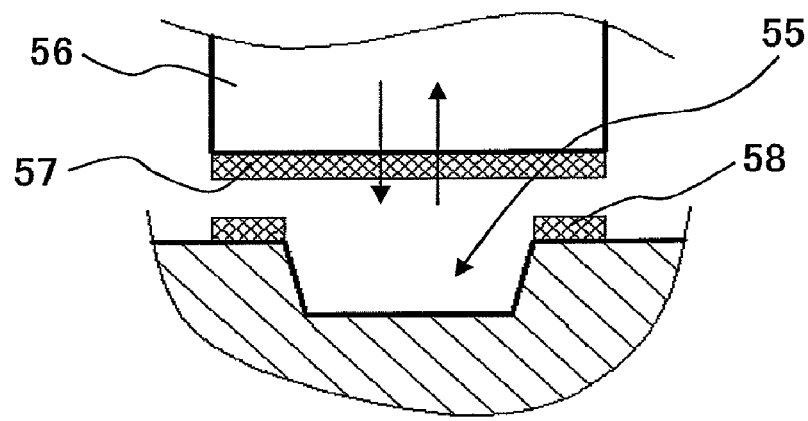
FIG. 11 is a schematic cross section illustrating the display portion machining operation in the fifth embodiment.
Figure 12:
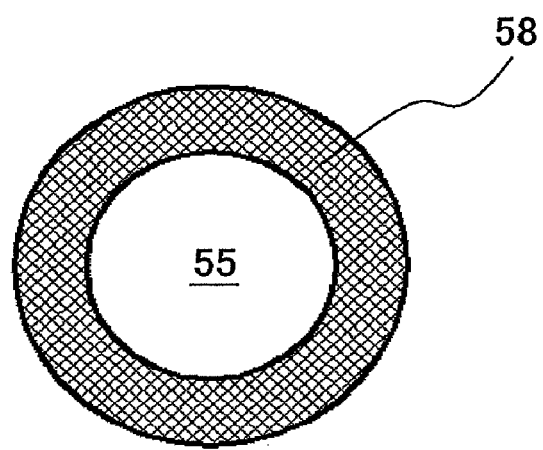
FIG. 12 is a partial plan view illustrating the machined state of the display portion in the fifth embodiment.

FIG. 11 is a schematic cross section illustrating the display portion machining operation in a fifth embodiment. FIG. 12 is a partial plan view illustrating the machined state of the display portion in the fifth embodiment.

A model identification portion 55 in the form of a recess is formed in the blank. As a stamper 56 descends and approaches the model identification portion 55, the area around the model identification portion 55 is coated with paint 57 from the stamper 56, forming an annular tinted portion 58 as the normal mark. If the combination is not the proper one, a tinted portion in which the internal portion is also painted is formed as an abnormal mark.

With this embodiment, the normal mark is recorded when the combination is correct, and the abnormal mark is recorded when the combination is incorrect.

A fluorescent paint may be used here, in which case there is no need for it to be a different color from that of the blank, and it can be detected easily when irradiated with a black light.

In addition to the painting and stamping discussed above, engraving may also be performed.

Sixth Embodiment

Figure 13:
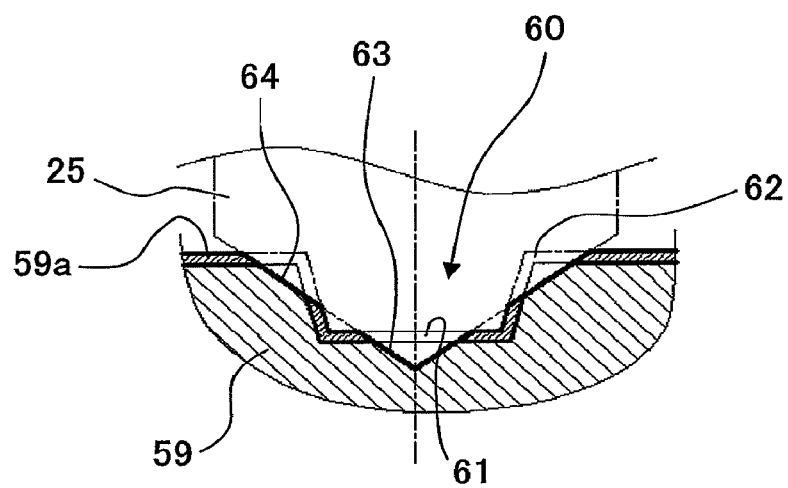
FIG. 13 is a schematic cross section illustrating the display portion machining operation in the sixth embodiment.
Figure 14:
FIG. 14 is a binarized image illustrating the machined state of the display portion in the sixth embodiment.

FIG. 13 is a schematic cross section illustrating the display portion machining operation in a sixth embodiment. FIG. 14 is a binarized image illustrating the machined state of the display portion in the sixth embodiment.

A model identification portion 60 is formed on a plate main body 59. The model identification portion 60 is a concave portion that is lower than the flat surrounding face. Further, a coating 59a is formed on the surface of the plate main body 59. A drill 25 has a pointed tip, and the outside diameter of the tip is greater than the outside diameter of the model identification portion 60.

When the drill 25 is lowered, it cuts the bottom 61 and shoulder 62 of the model identification portion 60, and a center circular portion 63 and an annular portion 64 are respectively formed as normal marks. As a result, as shown in FIG. 14, image processing produces an image including a white ring and a small white circle in the middle of this ring, which confirms that the combination is correct. If the combination is incorrect, the flat face is cut away and a circular portion (not shown) is formed as an abnormal mark.

In this embodiment, normal marks are recorded when the combination is correct, and an abnormal mark is recorded with the combination is incorrect.

Seventh Embodiment

Figure 15:
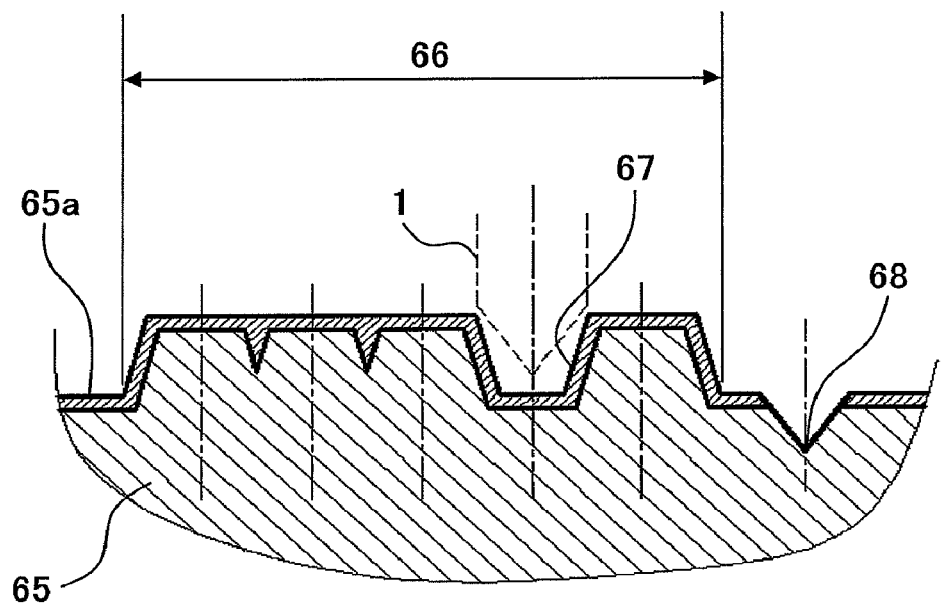
FIG. 15 is a schematic cross section illustrating the display portion non-machining operation in the seventh embodiment.

FIG. 15 is a schematic cross section illustrating the display portion non-machining operation in a seventh embodiment. A display portion 66 is formed in a plate main body 65. The display portion 66 is a convex region that is higher than the flat face, and has a plurality of regions as shown in the first embodiment. A model identification portion 67 is formed in one of the regions of the display portion 66. The model identification portion 67 is recessed lower than the other part of the display portion 66, and is about the same height as the flat face.

During precision machining, the drill 1 forms a reference mark 68 and descends at a different location depending on the type of machining program in the display portion 66. Therefore, if the blank model information matches the machining program model information, as shown in the drawings, the drill 1 goes inside the model identification portion 67. As a result, the other portion of the display portion 66 is not machined. If the combination is incorrect, on the other hand, the drill 1 ends up machining a portion of the display portion 66 other than the model identification portion 67. The above allows the combination to be deemed abnormal if there is a machining trace in a portion of the display portion 66 other than the model identification portion 67.

With this method, an abnormal mark is recorded if the material has not been machined properly. Therefore, whether or not the combination of material and machining program is correct can be determined from the presence or absence of an abnormal mark. Furthermore, the type of material can be determined by the model identification portion.

Also, no mark is recorded on the material if the material has been properly machined. However, in this case, that the combination of material and machining program is correct is indicated by the fact that the display portion of the base plate has not been machined.

In this embodiment, machining for mark formation is not performed when the combination is correct, and machining for mark formation is performed when the combination is incorrect. Since machining is thus not performed when the combination is correct, drill wear is prevented and cutting dust is reduced.

Furthermore, since the reference mark 68 is formed, it is easy to tell whether or not the combination is correct. With the above method, since no mark is formed when the combination is correct, if the blank has not be mounted accurately in the image recognition apparatus, the mark may not be recognizable even if one has been formed. In this case, a state in which the combination is correct and no mark has been formed cannot be distinguished from a state in which the combination is incorrect and a mark has been formed, but that mark cannot be recognized In view of this, whether or not a mark has been formed at the specific mark formation position can be determined more reliably by forming a reference mark.

Eight Embodiment

Figure 16:
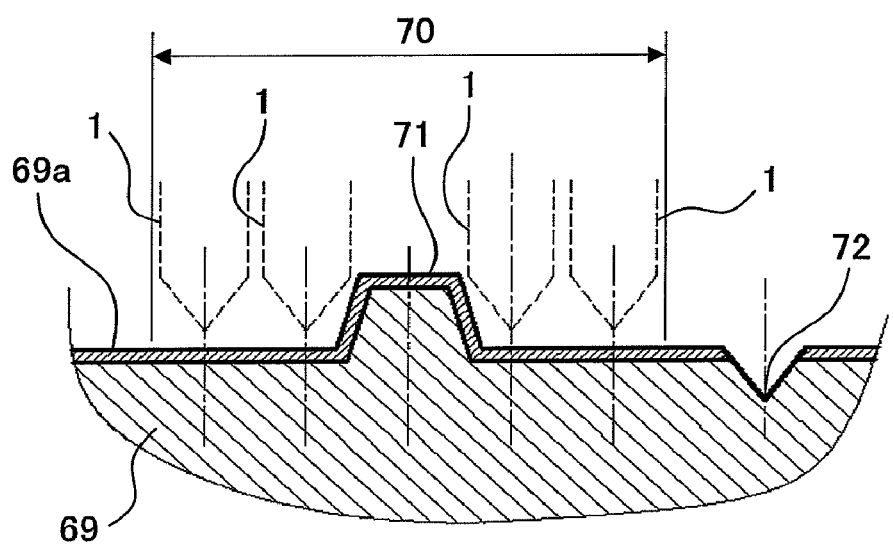
FIG. 16 is a schematic cross section illustrating the display portion non-machining operation in the eighth embodiment.

FIG. 16 is a schematic cross section illustrating the display portion non-machining operation in an eighth embodiment.

A coating 69a is formed on the surface of a plate main body 69. A display portion 70 is formed on the plate main body 69. The display portion 70 is a flat region, and has a plurality of regions as shown in the first embodiment. A model identification portion 71 is formed in one of the regions of the display portion 70. The model identification portion 71 is convex, protruding beyond the surrounding flat face.

During precision machining, the drill 1 forms a reference mark 72 and descends on the entire region of the blank, other than the model identification portion 71, where the model information coincides with the corresponding machining program, depending on the type of machining program in the display portion 70. Therefore, if the blank model information matches the machining program model information, as shown in the drawing, the drill 1 repeats the descending operation so as to avoid the model identification portion 71 (so that the other portion is hypothetically machined). As a result, the model identification portion 71 is not machined. If the combination is wrong, on the other hand, the drill 1 ends up cutting away the model identification portion 71. The above allows the combination to be deemed abnormal if there is a machining trace in the model identification portion 71 of the display portion 70.

With this method, an abnormal mark is recorded if the material has not been machined properly. Therefore, whether or not the combination of material and machining program is correct can be determined from the presence or absence of an abnormal mark.

Also, no mark is recorded on the material if the material has been properly machined. However, in this case, that the combination of material and machining program is correct is indicated by the fact that the display portion of the base plate has not been machined.

In this embodiment, machining for mark formation is not performed when the combination is correct, and machining for mark formation is performed when the combination is incorrect. Since machining is thus not performed when the combination is correct, drill wear is prevented and cutting dust is reduced.

Furthermore, since the reference mark 72 is formed, it is easy to tell whether or not the combination is correct.

Ninth Embodiment

Figure 17:
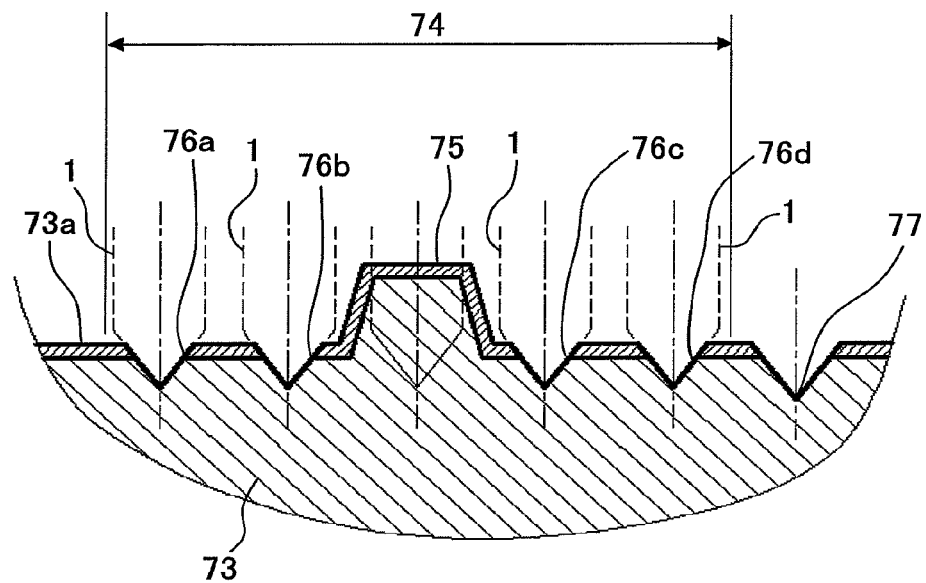
FIG. 17 is a schematic diagram illustrating the display portion machining operation in the ninth embodiment.

FIG. 17 is a schematic diagram illustrating the display portion machining operation in a ninth embodiment. A coating 73a is formed on the surface of a plate main body 73. A display portion 74 is formed on the plate main body 73. The display portion 74 is a flat region, and has a plurality of regions as shown in the first embodiment. A model identification portion 75 is formed in one of the regions of the display portion 74. The model identification portion 75 is convex, protruding beyond the surrounding flat face.

During precision machining, the drill 1 with a pointed tip successively cuts away all of the surface of the region other than the model identification portion 75 in the display portion 74. Therefore, if the blank model information matches the machining program model information, machining traces 76a to 76d are formed in the region other than the model identification portion 75. These machining traces are all the same size. If the blank model information does not match the machining program model information, a plurality of regions other than the model identification portion 75 are machined, and in addition the model identification portion 75 is also machined. In this case the size of the machining trace of the model identification portion 75 will be different from the size of the machining traces of the other regions (in this embodiment, the machining trace of the model identification portion are larger). The above allows the combination to be deemed abnormal if even one of the machining traces is a different size.

In this case, either a mark indicating a normal combination or a mark indicating an abnormal combination is always recorded. More specifically, a plurality of marks are formed in just the region other than the model identification portion if the combination is normal, and a plurality of marks are formed in both the model identification portion and the other region if the combination is abnormal.

The model identification portion may be concave, in which case if the combination is abnormal, the machining trace in the model identification portion will be smaller than the machining traces in the other region or the model identification portion will not be machined.

A plurality of model identification portion may also be formed.

Also, a reference mark may not be formed in this embodiment.

Tenth Embodiment

Figure 18:
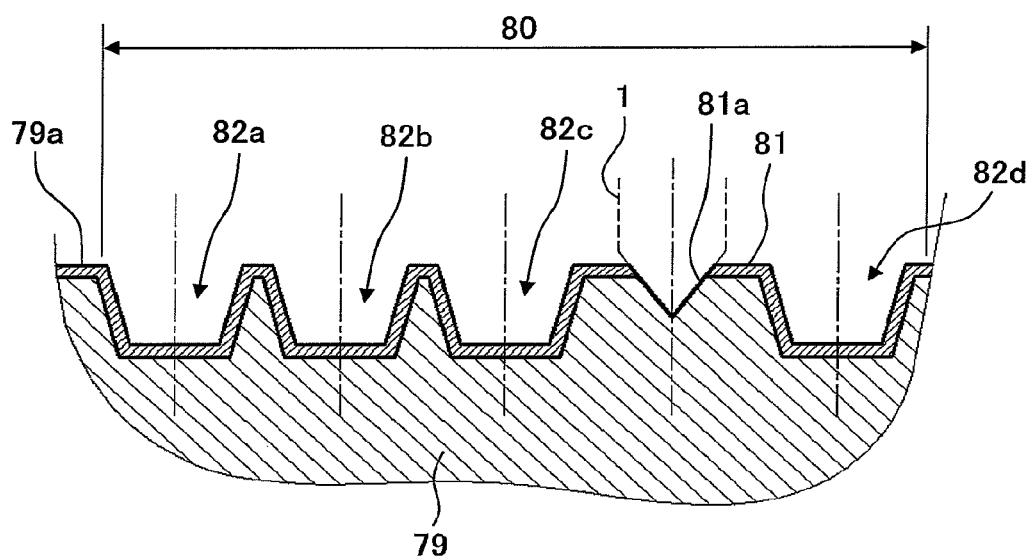
FIG. 18 is a schematic diagram illustrating the display portion machining operation in the tenth embodiment.

FIG. 18 is a schematic diagram illustrating the display portion machining operation in a tenth embodiment. A display portion 80 is formed on a plate main body 79. The display portion 80 has a plurality of concave regions 82a to 82d. A model identification portion 81 is formed on the display portion 80. The model identification portion 81 is the same height as the surrounding flat face of the display portion 80.

In the machining operation step, a drill 1 with a pointed tip is lowered to a specific height at the position of the model identification portion for the blank corresponding to the model of the machining program in question. As a result, when the blank for model A is machined by the machining program for model A, the drill 1 machines the model identification portion 81, and a pre-drill 81a is formed as a normal mark.

Eleventh Embodiment

In the first to tenth embodiments above, the operations for machining the display portion were carried out by a different method for every machining program. However, the operations for machining the display portion may be the same for all the machining programs. In this case, though, a machined portion with a different shape for every model must be provided to the display portion of the plate. Also, upon the step which follows the completion of the operation for machining the display portion, it is preferable to read the state of the display portion by image recognition and to specify the type of blank. This makes it possible to determine reliably whether or not a blank that has already been machined was machined according to the corresponding machining program. Or, when a blank is machined after the display portion has been machined, the blanks can be reliably sorted by model. Or, when a blank is machined after the display portion has been machined, the program can be flexibly switched to one corresponding to the blank model according to a blank whose display portion has been read and that has been set in the machining apparatus.

An example will be described through reference to FIG. 5 of the first embodiment. In the machining operation step, the drill 1 descends to the machining position in the entire region of the display portion. The drill 1 machines the model identification portion 21 to form the pre-drill 21a (the portion where the coating 12b is removed to reveal the aluminum substrate).

Next, the display portion on the external side of the blank is read by an image recognition apparatus including a camera and a computer capable of image processing, and image recognition is performed. In this image recognition, the type of blank is specified on the basis of the place where the pre-drill has revealed the aluminum substrate. Whether or not the blank has been machined according to the corresponding machining program is thereby determined. Or, when a blank is machined after the display portion has been machined, the blanks can be reliably sorted by model. Or, when a blank is machined after the display portion has been machined, the program can be flexibly switched to one corresponding to the blank model according to a blank whose display portion has been read and that has been set in the machining apparatus.

Twelfth Embodiment

The configuration may be such that information that is meaningful to a human or a machine appears on the surface when the combination is correct in order to create a state in which it is possible to determine whether or not a blank has been machined in the proper combination according to the corresponding machining program. "Meaningful information" here encompasses text, graphics, shapes, patterns, and combinations thereof that can be read and distinguished by a human or a machine (or within a range predetermined according to the design). Also, "meaningful information" may be various kinds of code, such as a barcode, a two-dimensional code, text, or graphics.

An example of machining over a preformed pattern will be described through reference to FIGS. 19A to 19C.

A model name "AB2" is formed in bold relief, etc., on the display portion of the blank as shown in FIG. 19A. Then, during the machining operation, the machining program moves the tool over the relief, etc., to cut away or tint the surface so as to write the specific model name. As a result, if the combination is correct, the correct model name shows up as in FIG. 19B, but if the combination is incorrect, the writing will appear strange as shown in FIG. 19C. FIG. 19C shows a case of an incorrect combination when the machining operation for model "AB1" has been applied to a blank for model "AB2".

The pattern or shape formed on the display portion of the blank, or the pattern formed in the machining of these, need not be continuous lines. For instance, it may be dot text, symbols, or picture text.

Thirteenth Embodiment

The configuration may be such that information that is meaningful to a human or a machine appears on the surface when the combination is correct in order to create a state in which it is possible to determine whether or not a blank has been machined in the proper combination according to the corresponding machining program. "Meaningful information" here encompasses text, graphics, shapes, patterns, and combinations thereof that can be read and distinguished by a human or a machine (or within a range predetermined according to the design). Also, "meaningful information" may be various kinds of code, such as a barcode, a two-dimensional code, text, or graphics.

A machining example in which a further pattern is added to a preformed pattern will be described through reference to FIGS. 20A to 20C.

Figure 20A:
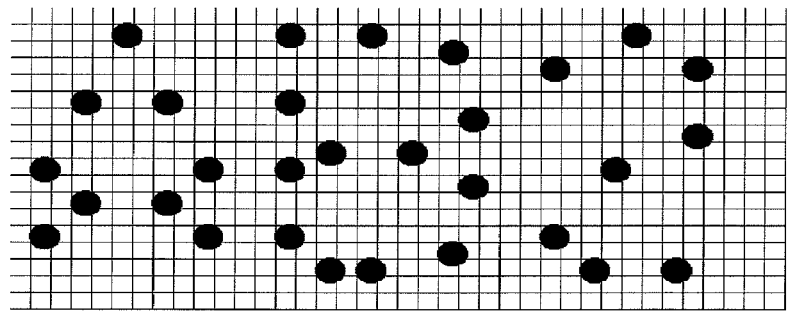
FIG. 20 consists of diagrams illustrating the machined state of the display portion machining operation in the thirteenth embodiment.
Figure 20B:
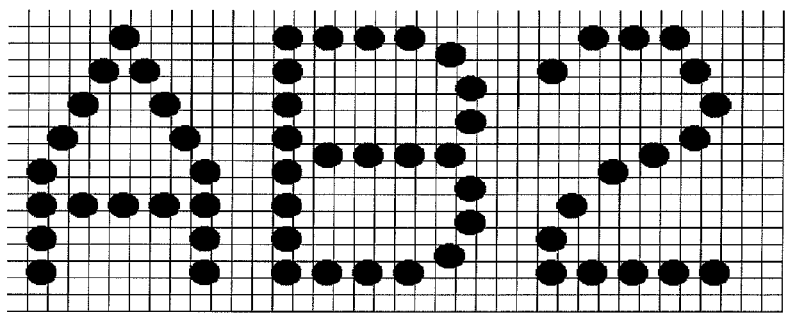
Figure 20C:
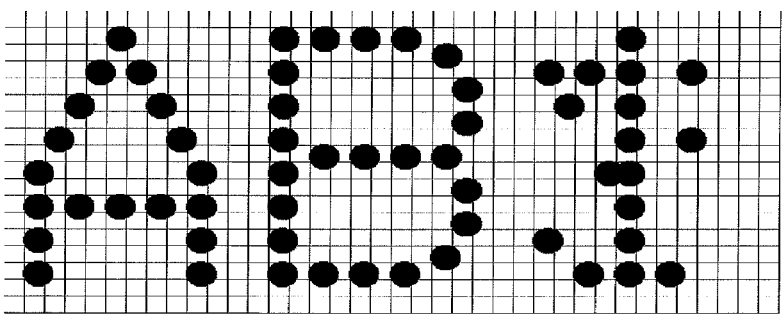

A plurality of holes or recesses, indicated by black, are formed in the display portion of the blank as shown in FIG. 20A. These holes make up part of the original model name "AB2", but at this stage, since holes or recesses have yet to be formed at a plurality of locations, a human looking at them will not recognize them as the text "AB2". Then, during the machining operation, the machining program lowers a drill and forms the plurality of holes or recesses so that the model name shows up. As a result, if the combination is correct, the proper model name will show up as in FIG. 20B, but if the combination is incorrect, a meaningless letter will show up as in FIG. 20C. FIG. 20C shows a case of an incorrect combination when the machining operation for model "AB1" has been applied to a blank for model "AB2".

Bumps, or marks made by stamping or the like, or a combination of these, may be used instead of holes or recesses to form the meaningful information.

Other Embodiments

In the first embodiment, a reference mark was formed during the machining operation, and the reference mark was also used in the judgment step. However, the reference mark may be formed not during the machining operation, but before that, or a structure having another function can be utilized as a reference mark. For instance, a VCM pivot support shaft fixing hole, or a threaded hole for drive fixing provided to a housing may be utilized as a reference mark.

The number of regions in the mark recording portion, and their layout, are not limited to the above embodiments. For instance, the number of regions of the mark recording portion may be changed according to the number of models.

Cutting may be performed not by pre-drilling, but by forming a groove.

The following method is possible, for example, when no insulating black coating is provided. The blank surface is subjected to sandblasting, for example, to increase the surface roughness. When this blank undergoes precision machining, the mark can be formed at the model identification portion by reducing the surface roughness of the model identification portion through cutting, coating, or the like. More specifically, this is because the model identification portion is glossy, and the extent of irregular reflection varies in the other portion.

A hard disk drive was used as an example of an information apparatus in the above embodiments, but the present invention can also be applied to optical disk devices and other such recording and reproducing devices, and to laser scanners and other such information apparatuses other than what was discussed above.

Furthermore, a base plate was used as an example of the base member in the above embodiments, but the present invention can also be applied to other members. For example, it can be applied to products in which members whose basic design is similar, such as an automotive engine, a transmission, or a chassis frame, but differ slightly in form with the model, function as a basis with which other parts are assembled to complete a finished product.

The method for manufacturing a base member pertaining to the present invention can be applied to the manufacture of hard disk drives and other such information apparatuses, and therefore has industrial applicability.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A method for manufacturing a base member that includes a plurality of components mounted thereon in which a plurality of types of material are machined according to machining programs that differ for each type of material, the method comprising:
    providing a display portion with a different shape for each type of material;
    machining a material according to a machining program;
    performing an operation for machining the display portion thereby making it possible to determine whether or not the material has been machined in accordance with a corresponding machining program; and
    judging, on the basis of a state of the display portion, whether or not the material was machined according to the corresponding machining program.

2. The method for manufacturing a base member according to claim 1, wherein,
    in the operation for machining the display portion, an operation is performed for machining the display portion by a different method for each machining program.

3. The method for manufacturing a base member according to claim 1, wherein,
    in the operation for machining the display portion, a normal mark is recorded on the display portion when the material is machined in accordance with the corresponding machining program.

4. The method for manufacturing a base member according to claim 3, wherein,
    in the providing of a display portion, a model identification portion is provided to the display portion for identifying the type of material, and
    in the operation for machining the display portion, the normal mark is recorded by machining the model identification portion or a portion of the display portion other than the model identification portion.

5. The method for manufacturing a base member according to claim 1, wherein,
    in the operation for machining the display portion, an abnormal mark is recorded on the display portion when the material is machined according to a machining program other than the corresponding machining program.

6. The method for manufacturing a base member according to claim 5, wherein,
    in the providing of a display portion, a model identification portion is provided to the display portion for identifying the type of material, and
    in the operation for machining the display portion, the abnormal mark is recorded by machining the model identification portion or a portion of the display portion other than the model identification portion.

7. The method for manufacturing a base member according to claim 1, wherein, in the judging on the basis of the state of the display portion, a reference mark in a reference location is also used.

8. The method for manufacturing a base member according to claim 7, further comprising:
    forming the reference mark near the display portion, as part of the machining of the material.

9. The method for manufacturing a base member according to claim 1, wherein,
    in the operation for machining the display portion, a plurality of locations are machined within the display portion.

10. The method for manufacturing a base member according to claim 1, wherein,
    in the operation for machining the display portion, a surface of part of the display portion is made to be different in its shape or properties.

11. The method for manufacturing a base member according to claim 10, wherein,
    in the operation for machining the display portion, a color of part of the display portion is made to be different from a color of another part of the display portion.

12. The method for manufacturing a base member according to claim 10, wherein,
    in the operation for machining the display portion, the surface of part of the display portion is peeled off.

13. The method for manufacturing a base member according to claim 11, wherein,
    in the operation for machining the display portion, the surface of part of the display portion is tinted or painted.

14. The method for manufacturing a base member according to claim 10, wherein,
    in the operation for machining the display portion, a surface roughness of part of the display portion is made to be different from a surface roughness of another part of the display portion.

15. A method for manufacturing a motor having a base member in which a plurality of types of material are machined according to machining programs that differ for each type of material, comprising:
    providing a display portion with a different shape for each type of material;
    machining a material according to a machining program;
    performing an operation for machining the display portion thereby making it possible to determine whether or not the material has been machined in accordance with a corresponding machining program;
    judging, on the basis of a state of the display portion, whether or not the material was machined according to the corresponding machining program; and
    mounting various components to the base member.

16. A method for manufacturing an information apparatus having a motor with a base member in which a plurality of types of material are machined according to machining programs that differ for each type of material, comprising:
    providing a display portion with a different shape for each type of material;
    machining a material according to a machining program;
    performing an operation for machining the display portion thereby making it possible to determine whether or not the material has been machined in accordance with a corresponding machining program;
    judging, on the basis of a state of the display portion, whether or not the material was machined according to the corresponding machining program;
    fabricating the motor by assembling various components to the base member; and
    assembling into the motor a rotating body that is rotated by the motor, and an information transmission device for transmitting information in conjunction with the rotating body.

* * * * *